United States Patent
Torsner et al.

(10) Patent No.: US 7,187,677 B2
(45) Date of Patent: Mar. 6, 2007

(54) AVOIDING STALL CONDITIONS AND SEQUENCE NUMBER AMBIGUITY IN AN AUTOMATIC REPEAT REQUEST PROTOCOL

(75) Inventors: Per Johan Torsner, Espoo (FI); Janne Peisa, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 893 days.

(21) Appl. No.: 10/152,986

(22) Filed: May 23, 2002

(65) Prior Publication Data

US 2003/0169741 A1 Sep. 11, 2003

(30) Foreign Application Priority Data

Oct. 19, 2001 (SE) .................................... 0103506

(51) Int. Cl.
*H04L 12/56* (2006.01)
(52) U.S. Cl. ........................................ 370/394; 370/469
(58) Field of Classification Search ................ None
See application file for complete search history.

(56) References Cited

U.S. PATENT DOCUMENTS

| | | | |
|---|---|---|---|
| 6,335,933 B1* | 1/2002 | Mallory | 370/394 |
| 6,424,625 B1* | 7/2002 | Larsson et al. | 370/236 |
| 6,920,152 B1* | 7/2005 | Chang et al. | 370/474 |
| 6,934,752 B1* | 8/2005 | Gubbi | 709/225 |
| 2001/0007137 A1 | 7/2001 | Suumaki et al. | |
| 2002/0034182 A1* | 3/2002 | Mallory | 370/394 |
| 2002/0053062 A1* | 5/2002 | Szymanski | 714/801 |
| 2003/0081664 A1* | 5/2003 | Lu et al. | 375/222 |
| 2003/0191844 A1* | 10/2003 | Meyer et al. | 709/227 |
| 2004/0062222 A1* | 4/2004 | Seidel et al. | 370/335 |

FOREIGN PATENT DOCUMENTS

| | | |
|---|---|---|
| EP | 1 161 022 | 12/2001 |
| WO | WO 00/57594 | 9/2000 |
| WO | WO 00/60799 | 10/2000 |
| WO | WO 01/37473 | 5/2001 |

OTHER PUBLICATIONS

International Search Report for International Application No. PCT/SE02/01828 dated Jan. 29, 2003.
International Search Report for International Application No. PCT/SE00/02268 dated Feb. 27, 2001.

(Continued)

*Primary Examiner*—Duc Ho
(74) *Attorney, Agent, or Firm*—Nixon & Vanderhye P.C.

(57) ABSTRACT

The present invention provides a stall avoidance mechanism that may be used alone or in conjunction with an ambiguity avoidance mechanism in an ARQ protocol. Both mechanisms decrease data delays and increase data throughput rates. Stall avoidance is accomplished by determining whether a stall condition exists with respect to receiving a missing data unit. In one example, only a single timer is needed to avoid stalls. Retransmission ambiguities may be avoided using a retransmission window in the transmitter and/or a receive window in the receiver. Although each mechanism may be used independently of the other, a preferred example embodiment uses a stall avoidance timer, a retransmission window in the transmitter, and a receive window in the receiver.

42 Claims, 9 Drawing Sheets

OTHER PUBLICATIONS

3rd Generation Partnership Project; Technical Specification Group Radio Access Network; MAC protocol specification (Release 5), 3GPP TS 25.321 V5.2.0 (Sep. 2002).

Technical Specification Group Access Network; UTRA High Speed Downlink Packet Access (HSDPA); Overall description; Stage 2 (Release 5), 3GPP TS 25.308 V5.0.0 (Sep. 2001).

* cited by examiner

AVOIDING STALL CONDITIONS AND SEQUENCE NUMBER AMBIGUITY IN AN AUTOMATIC REPEAT REQUEST PROTOCOL

PRIORITY APPLICATION

This application claims priority from provisional Swedish patent application number, SE 0103506-2, filed on Oct. 19, 2001, the disclosure of which is incorporated herein by reference.

FIELD OF THE INVENTION

The present invention relates to data communications, and in particular to Automatic Repeat reQuest (ARQ) protocols used in data communications.

BACKGROUND AND SUMMARY OF THE INVENTION

In digital data communications systems, it is common for data packets transmitted over a communications channel to be corrupted by errors, e.g., when communicating in hostile environments. Wireless radio communications are often conducted in an especially hostile environment. The radio channel is subjected to a barrage of corrupting factors including noise, rapidly changing communications channel characteristics, multi-path fading, and time dispersion which may cause intersymbol interference, and interference from adjacent channel communications.

There are numerous techniques that may be employed by a receiver to detect such errors. One example of an error detection technique is the well-known cyclic redundancy check (CRC). Other techniques used in packet data communications employ more advanced types of block codes or convolutional codes to accomplish both error detection and error correction. For both error detection and error correction, channel coding is applied which adds redundancy to the data. When the information is received over the communications channel, the received data is decoded using the redundancy to detect if the data has been corrupted by errors. The more redundancy built into a unit of data, the more likely errors can be accurately detected, and in some instances, corrected using a forward error correcting (FEC) scheme. In a pure FEC scheme, the flow of information is uni-directional, and the receiver does not send information back to the transmitter if a packet decoding error occurs.

In many communications systems, including wireless communications, it is desirable (if possible) to have a reliable data delivery service. Most reliable data delivery protocols use a fundamental retransmission technique where the receiver of the data responds to the sender of the data with acknowledgments (ACKs) and/or negative acknowledgments (NACKs). This technique is commonly known as Automatic Repeat reQuest (ARC) transaction processing. Coded data packets are transmitted from a sender to a receiver over a communications channel. Using the error detection bits (the redundancy) included in the coded data packet, each received data packet is processed by the receiver to determine if the data packet was received correctly or corrupted by errors. If the packet was correctly received, the receiver transmits an acknowledgment (ACK) signal back to the sender. If the receiver detects errors in the packet, it may also send an explicit negative acknowledgment (NACK) to the sender. When the NACK is received, the sender can retransmit the packet. In a pure ARQ system, the channel code is only used for error detection.

In hybrid ARQ (HARQ), features of a pure FEC scheme and a pure ARQ scheme are combined. Error correction and error detection functions are performed along with ACK/NACK feedback signaling. The channel code in a hybrid ARQ scheme may be used for both error correction and error detection. Alternatively, two separate codes can be used: one for error correction and one for error detection. A NACK signal is sent back to the transmitter if an error is detected after error correction. The erroneously received data packet in this first type of hybrid ARQ system is discarded. A more efficient hybrid ARQ scheme is to save the erroneously received and negatively acknowledged data packet and then combine it in some way with the retransmission. Hybrid ARQ schemes that use packet combining are referred to as hybrid ARQ with combining. In a hybrid ARQ combining scheme, the "retransmission" may be an identical copy of the original packet. If the retransmission is identical to the original transmission, the individual symbols from multiple packets are combined to form a new packet consisting of more reliable symbols. Alternatively, the retransmission may use incremental redundancy (IR). In IR packet combining, additional parity bits are transmitted which makes the error correction code more powerful than, and generally superior to, identical packet combining.

Equally as important as reliable data delivery is fast data delivery. To deliver data quickly, many data communications systems strive to increase the available peak transmission rate and to reduce delay. Reducing delay is particularly important in order to support high data rates efficiently.

One example area where speed is important is in High Speed Downlink Packet Access (HSDPA) channels to employed in some mobile radio communications networks. Currently, it is proposed the HSDPA channels employ a HARQ protocol as specified in the 3GPP Technical Specification (TS) 25.308 v0.1.0 "UTRA High Speed Downlink Packet Access," released by the 3GPP ($3^{rd}$ Generation Partnership Project) in September 2001. The specified HARQ protocol retransmission scheme is implemented using retransmission entities in an extension of the media access control (MAC) protocol layer in a base station (sometimes referred to as a "Node B") and a mobile user equipment (UE). The retransmission entity stores erroneously received data blocks, for example in the UE, and combines them with corresponding, later-received retransmissions of the same data blocks. Two (or more) erroneously received copies of a data block may be combined in the UE receiver into a correct data block. The MAC-HSDPA retransmission entity delivers correctly received data blocks to a higher radio link control (RLC) protocol layer as RLC packet data units (PDUs).

The HARQ protocol defined in that specification includes a reordering entity that achieves in-sequence delivery of received data units to the higher RLC protocol layer. This function is necessary because transmitted data units numbered 0, 1, 2, 3, . . . experience varying transmission delays caused by the air-interface, and mainly as a result of a different number of retransmissions needed for each data unit. Thus, if data unit 2 is correctly received before data unit 1, data unit 2 is buffered until data unit 1 is correctly received before both data units 1 and 2 are provided to the upper protocol layer.

Unfortunately, the specified HARQ protocol and ARQ protocols in general will "stall" in certain situations. In the simple example just given, a stall situation would occur when the reordering entity waits for a long time (or it may even wait indefinitely) for data-unit 1 to be correctly received. This may occur when a NACK message for data block has been corrupted or is otherwise erroneously identified when received as an ACK. As a result of this error, there will be no retransmission of the data unit, even though it should be retransmitted. Another stall situation occurs when the retransmission of a data unit is interrupted because the number of retransmissions exceeds a limit or because other higher priority data must be sent. The retransmission may be cancelled or resumed at a later time. In general, a stall occurs when a data unit is lost or will not be satisfactorily received in a foreseeable, reasonably short time.

It is an object of the present invention to avoid stall situations in order to decrease data delays, and ultimately, increase data throughput rates.

It is an object of the present invention to provide a method and an apparatus for stall avoidance for an ARQ protocol that is relatively easy to implement.

In addition to stall problems, ARQ protocols also suffer from sequence number ambiguities if the data unit numbering scheme repeats in modulo fashion, e.g., modulo-8 sequence numbering follows this kind of repeating pattern: 0, 1, 2, 3, 4, 5, 6, 7, 0, 1, 2, 3, 4, 5, 6, 7, 0, 1, 2, 3, 4, 5, 6, 7, 0, 1, 2 . . . . Assume for example that a data unit with sequence number (SN) 6 is sent at a first time interval as part of a first set of data units numbered 0–7, but the SN 6 data unit is not satisfactorily received at the receiver. A request for retransmission of data unit SN 6 is sent back to the transmitter. However, before the transmitter retransmits data unit SN 6 from the first set, the transmitter transmits another data unit SN 6 from a second set of data units numbered 0–7 for the first time. The receiver detects the just-transmitted-for-the-first-time data unit SN 6, rather than the retransmitted data unit SN 6 as requested The receiver cannot detect or resolve this ambiguity, which results in errors.

It is an object of the present invention to provide a mechanism that avoids such ambiguities either at the transmitter, the receiver, or at both.

The present invention provides a stall avoidance mechanism that may be used alone or in conjunction with an ambiguity avoidance mechanism. Both decrease data delays and increase data throughput rates.

Stall avoidance is accomplished by determining whether a stall condition exists with respect to receiving a missing data unit. The term "missing data unit" includes a data unit that has not been received, a data unit that is incorrectly received, or an incorrectly received data unit that cannot be corrected. Alternatively, a missing data unit may be viewed as a data unit that the receiver requests the transmitter to retransmit for any reason.

In one non-limiting, example embodiment, a timer is started if a data unit is received having a sequence number greater than the sequence number of the missing data unit. If the timer expires before the missing data unit is received, thereby indicating that a stall condition exists, received data units having sequence numbers less than the sequence number of the missing data unit are removed from the receiver buffer and provided to the higher protocol layer for further processing. On the other hand, if the missing data unit is received before the timer expires, the timer is stopped and the received data units having sequence numbers less than that of the missing data unit are removed from the buffer and sent to the higher protocol layer.

In ARQ transmission schemes where data units are transmitted in sequence modulo-N, N being a larger sequence number, retransmission ambiguities may be avoided using a retransmisson window in the transmitter and/or a receive window in the receiver. The size of the retransmission window preferably corresponds to a number of data units less than N, e.g., N/2. The retransmission window is positioned with respect to a retransmit buffer to avoid ambiguity in the receiver when receiving data units with sequence numbers of originally-transmitted data units and retransmitted data units. More specifically, retransmission of a data unit is only permitted when its sequence number is within a current position of the transmission window in the sequence numbering. An upper end of the window is positioned in the retransmit buffer at a sequence number that is less than or equal to a difference between the highest sequence number most recently transmitted and the window size. The transmission window is moved to a next sequence number position in the modulo-N sequence after each data unit is transmitted.

The receiver may also use a receiving window as another way to avoid ambiguity between orignally-transmitted and retransmitted data units. The size of the receiving window preferably corresponds to a number of data units less than N, e.g., N/2. An upper end of the receiving window is positioned at a data unit sequence number less than or equal to a difference between a highest sequence number most recently received and the window size. A received data unit having a received sequence number within a current position of the receiving window is stored at a location in the buffer corresponding to its sequence number. However, if a received data unit inside the window was previously received, it is discarded. If it is outside the receiving window, the data unit is also stored in the buffer at its corresponding sequence number position, and the receiver window is advanced so that the sequence number of that data unit forms the upper end of the window. After moving the receive window, data units having a sequence number less than that the lower end of the window are removed from the buffer.

Although each mechanism may be used independently of the other, a preferred example embodiment uses a stall avoidance timer, a retransmission window in the transmitter, and a receive window in the receiver.

BRIEF DESCRIPTION OF THE DRAWINGS

The foregoing and other objects, features, and advantages of the present invention may be more readily understood with reference to the following description taken in conjunction with the accompanying drawings. For a better understanding, reference is made to the following drawings and preferred embodiments of the invention.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
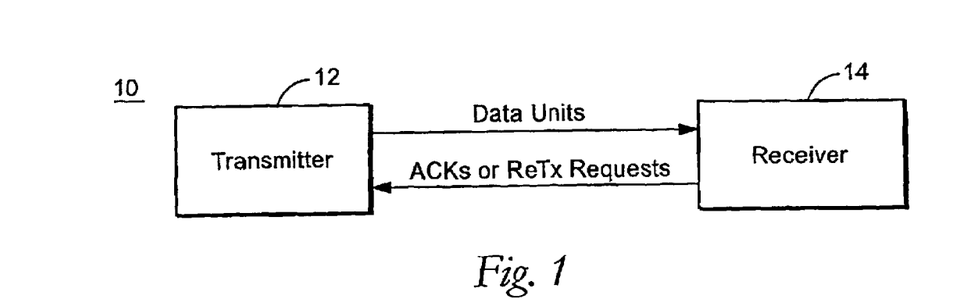
FIG. 1 illustrates a communications system between a transmitter and a receiver employing an ARQ type protocol.

FIG. 1 illustrates a simple communication system 10 in which a transmitter 12 transmits data units to a receiver 14. Each of the data units has a corresponding sequence number, and the transmitter 12 sends them over a communications channel in sequence. Because of various factors, some of the data units may not be received or received accurately by the receiver 14. As a result, the receiver sends an acknowledgement to the transmitter (ACK) for each correctly received data unit. For a data unit determined to be missing, in error, or uncorrectable, a retransmission request is sent for the transmitter to resend the data unit identified by its sequence number. A retransmission request may be sent in the form of a negative acknowledgement (NACK).

Figure 2:
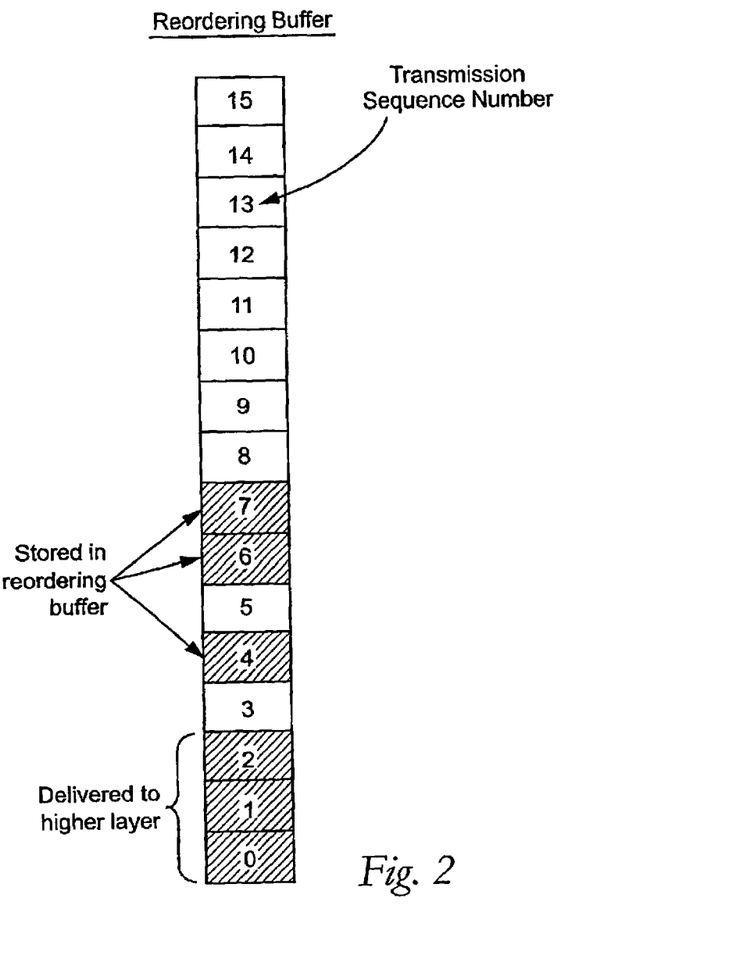
FIG. 2 illustrates an example of a reordering buffer employed in a receiver used to deliver received data units in sequence to higher protocol layers.

As described in the background, there are situations in which a transmitted data unit is not received or improperly received and, for whatever reason, need to be retransmitted. Hereafter, such a data unit is generally referred to as a missing data unit as defined above. FIG. 2 illustrates an example reordering buffer in the receiver 14. Data units 0, 1, 2, 4, 6, and 7 have been correctly received and are stored in corresponding locations a reordering buffer for subsequent in-sequence delivery to a higher protocol layer. Consecutive data units 0, 1, and 2 are delivered to the higher protocol layer. Delivery of data units 4, 6, and 7 to the higher layer is prevented because intervening data units 3 and 5 are missing. If a missing data unit is permanently lost or will not be received in a foreseeable time, a stall condition exists. The present invention avoids the stall avoidance using a stall avoidance timer.

Figure 3:
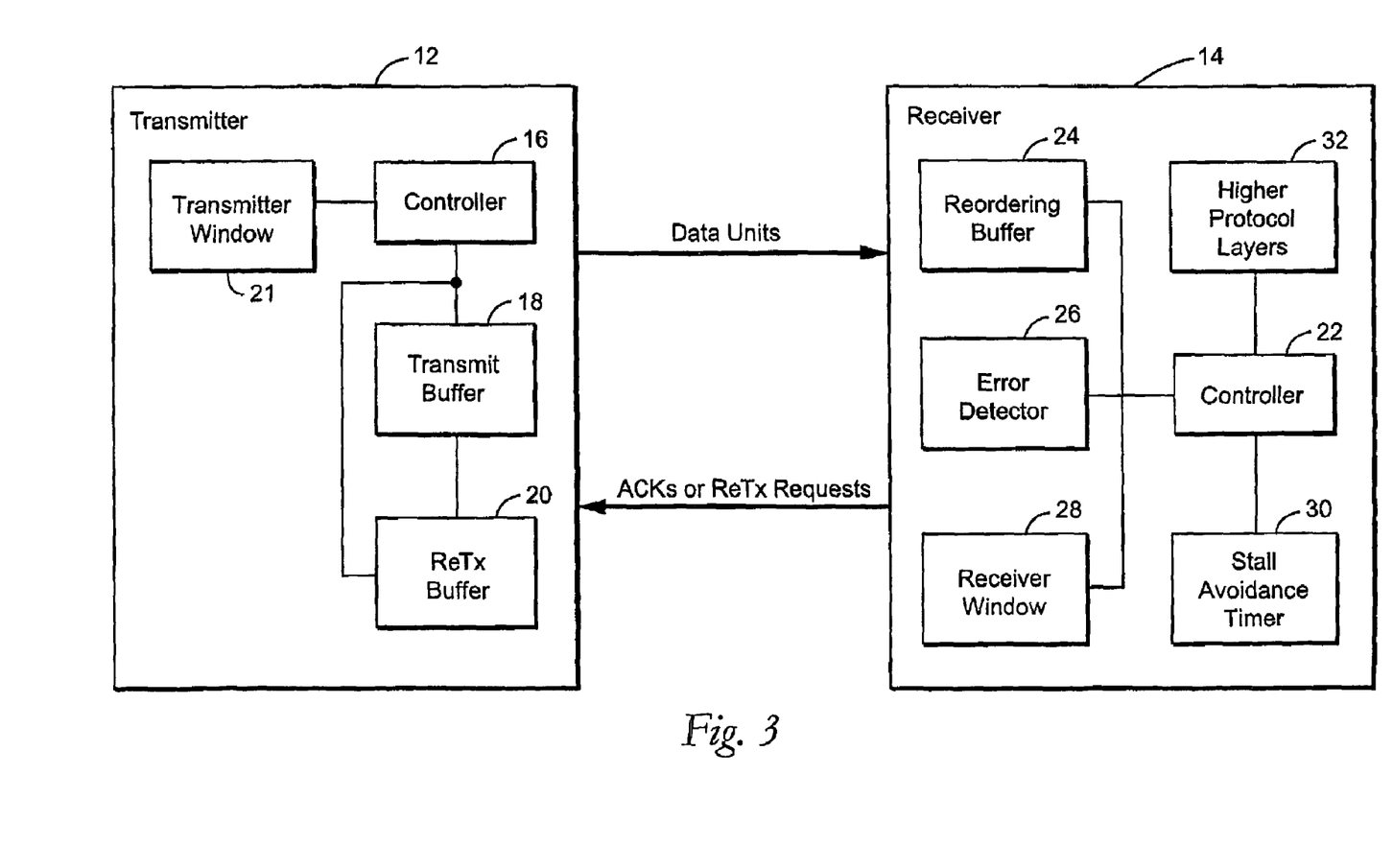
FIG. 3 is a function block diagram illustrating a transmitter and a receiver in accordance with one example embodiment of the present invention.

FIG. 3 shows the transmitter 12 and the receiver 14 shown in additional detail and including, among other things, a stall avoidance timer 30. Transmitter 12 includes a controller 16 coupled to a transmit buffer 18, a retransmitter buffer 20, and a transmitter window 21. The transmit buffer 18 stores data units from higher protocol layers to be initially transmitted via a communications channel to the receiver 14. When the data units are transmitted, they are also stored in the retransmit buffer 20 until an acknowledgement or a request to retransmit request is received from the receiver 14. The transmitter window 21 is described below in conjunction with ambiguity avoidance.

The receiver 14 includes a controller 22 coupled to a reordering buffer 24, an error detector 26, a receiver window 28, a stall avoidance timer 30, and higher protocol layers 32. The reordering buffer 24 stores correctly received data units by sequence number. An example of a reordering buffer is shown in FIG. 2. Error detector 26 detects errors in received data units and may also include functionality to correct certain types of errors. Only correct (or corrected) data units are stored in the reordering buffer 26. The controller sends an acknowledgement (ACK) for correctly received data units, and a request to retransmit for missing data units. The receiver window 28 is described below in the context of ambiguity prevention. The stall avoidance timer 30 avoids stall situations where a missing PDU prevents delivery of correctly received PDUs to higher protocol layers after a certain period of time.

Figure 4:
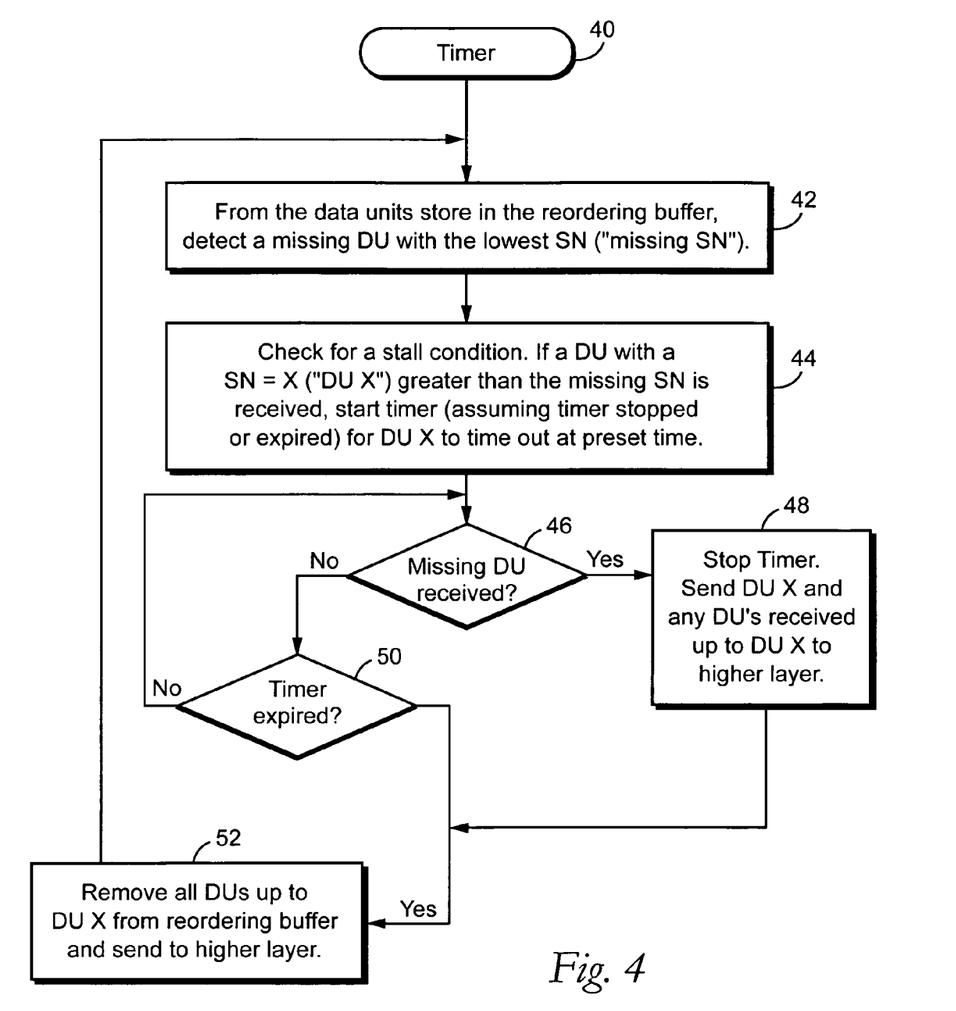
FIG. 4 illustrates a Timer routine outlining procedures in accordance with one example embodiment of a stall avoidance mechanism.

In this regard, reference is made to the Timer procedures (block 40) shown in flowchart form in FIG. 4. From the data units stored in the reordering buffer 24 in the receiver, the controller 22 detects a missing data unit with a lowest sequence number (SN) referred to as "the missing SN" (block 42). In block 44, a check is made for a stall condition. If a data unit with a sequence number equal to X, which is greater than the missing sequence number is received, a timer is started (assuming the timer is stopped or otherwise expired) for the data unit X. The timer unit is set to time out at a preset time. The preset time can be any time but is typically a trade-off between an acceptable data unit delay and an acceptable data unit loss. Because these trade-off parameters are often a function of quality of service requirements, the timer value may be set when quality of service requirements are known.

A decision is made in block 46 whether the missing data unit has been received. If so, the stall condition timer is stopped. The data unit X, along with any received data units stored in the reordering buffer having sequence numbers up to X, are removed from the buffer and sent up to a higher protocol layer (block 48), and the process repeats at block 42. If the missing data unit has not yet been received, a decision is made in block 50 whether the timer has expired. If not, control returns to block 46. If the stall condition timer has expired, all data units are removed from the reordering buffer up to data unit X and sent to the higher layer (block 52), and the process repeats at block 42.

Thus, the timer-based mechanism in accordance with the preferred example embodiment prevents stalls from occurring in ARQ protocols when a missing data unit will not be received within a reasonable time frame. When a missing data unit is not received in the timeout period, it is assumed to be permanently missing, and correctly received data units are delivered without further delay. Because this stall condition avoidance mechanism only requires a single timer, it is easily implemented and controlled. However, other stall condition avoidance mechanisms may be used.

Figure 5A:
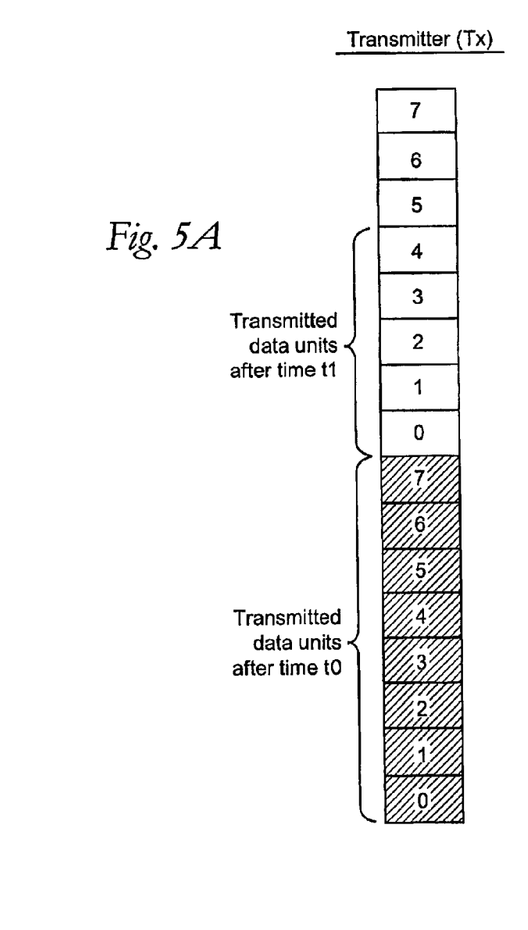
FIGS. 5A and 5B illustrate an example of an ambiguity of received units at the receiver when a sequence number repeating ARQ protocol is used.
Figure 5B:
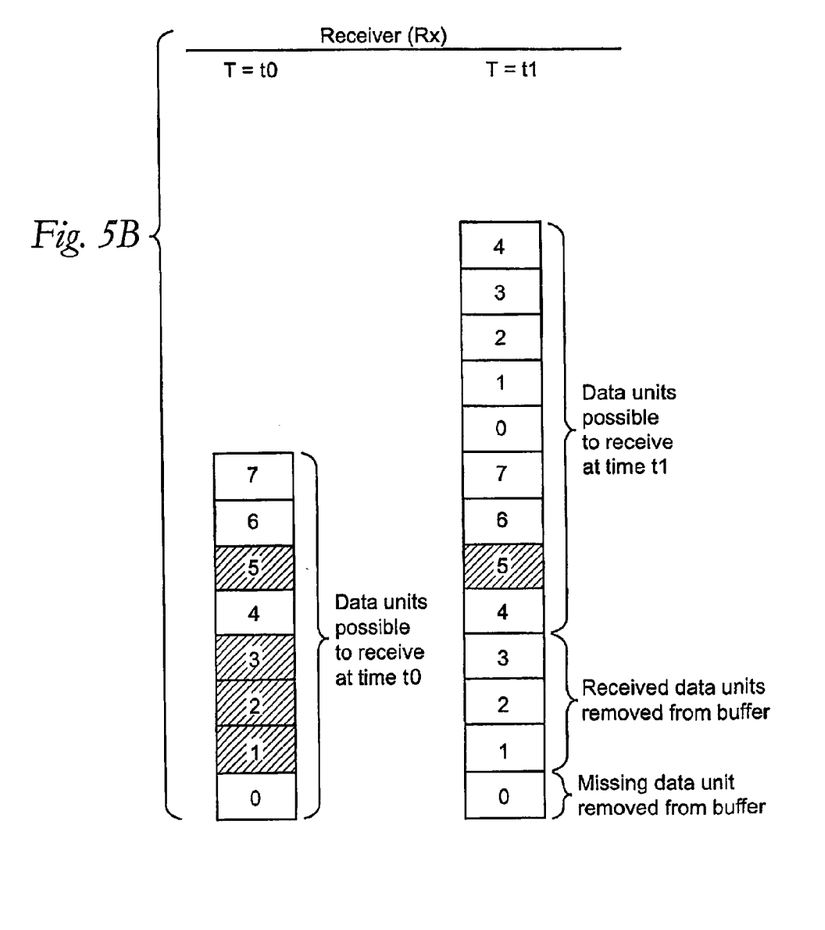

Even if stall conditions are avoided with respect to missing data units, there still is the problem of ambiguity between transmitted data units and retransmitted data units having the same sequence number. FIGS. 5A and 5B show an example of this ambiguity problem. In this example, the data unit sequence numbering scheme goes from 0 to 7 and then repeats—modulo-8. In FIG. 5A, the transmitter transmits a first set of eight data units having sequence numbers 0–7 by time T0. By time T1, the transmitter has transmitted a second set of eight data units also having sequence numbers 0–7. In FIG. 5B, the receiver has only received data units 1, 2, 3, and 5 at time T0 and is missing data units 0, 4, 6, and 7. Accordingly, the receiver sends a request to retransmit data units 0, 4, 6, and 7 to the transmitter which is not received and processed in the transmitter until time T1. After time T1, the receiver may receive both retransmitted units 0, 4, 6, or 7 from the first data unit set and originally-transmitted data units 0, 1, 2, 3, and 4 from the second set. This example uses the stall condition avoidance mechanism, so that by time T1, data unit 0 is deemed permanently missing and removed. Correctly received data units 1, 2, and 3 are also removed and delivered to the next higher protocol layer. But an ambiguity remains. How does the receiver know whether a received data unit 4 is the data unit 4 from the first set or the second set? The receiver does not know where to put the just-received data unit 4 in the reordering buffer. The ambiguity is even more problematic if the stall condition avoidance is not used because if the just received data unit has a SN=0, the receiver will not know whether it is retransmitted (from the second set) or originally-transmitted (from the second set).

Figure 6:
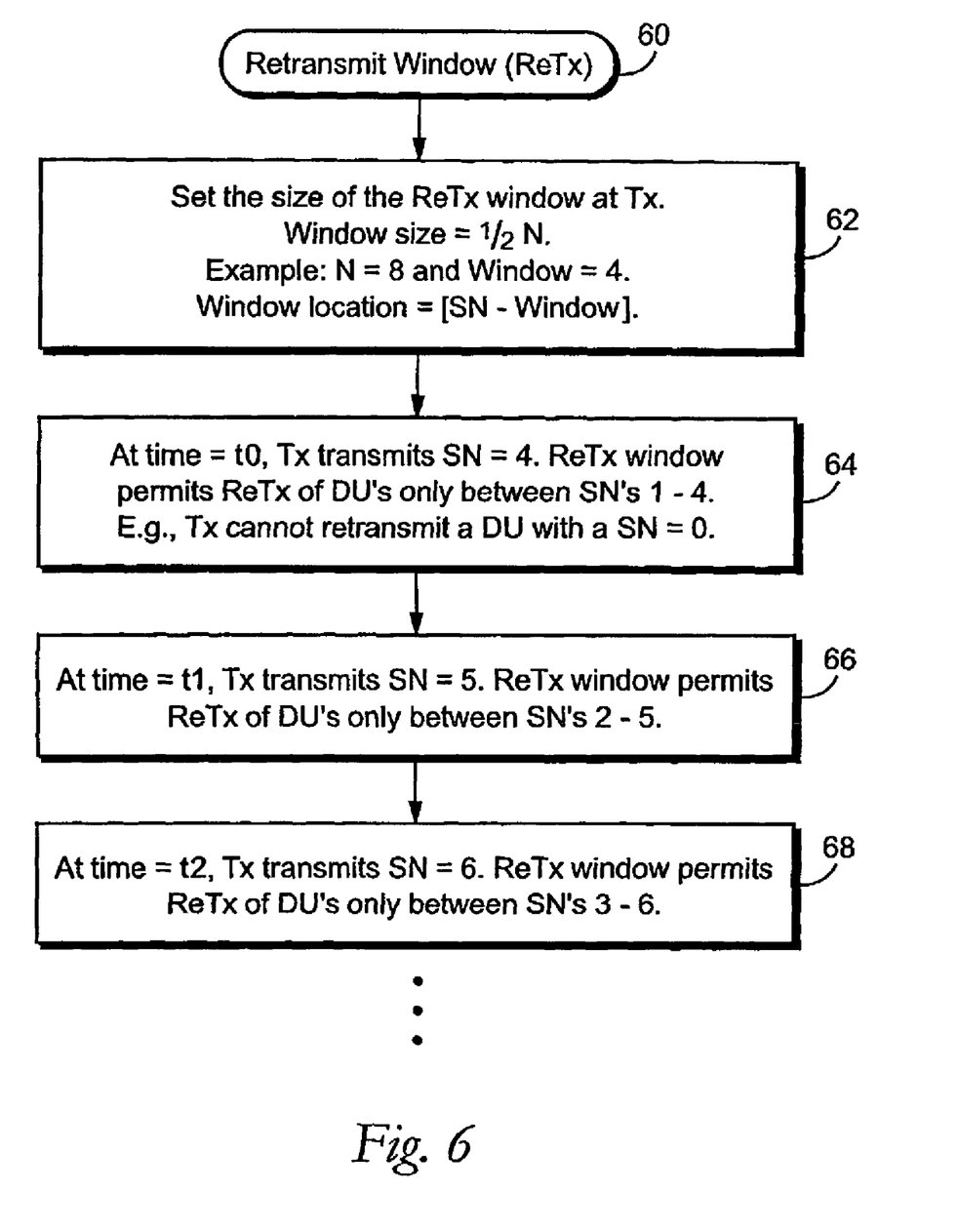
FIG. 6 illustrates a Transmit Window routine in accordance with one example embodiment of an ambiguity prevention mechanism.

A fit ambiguity prevention mechanism implemented at the transmitter is described in conjunction with Retransmit Window procedures (block 60) shown in flowchart form in FIG. 6. Here, the transmitter employs a retransmit window to specify a set of data units that may be retransmitted during certain time frames. By only retransmitting data units within the retransmit window, sequence number ambiguities at the receiver between transmitted and retransmitted data units are avoided.

Initially, the size of the retransmit window is set at the transmitter (block 62). Assuming that the sequence numbering repeats modulo-N, the window size is less than N. In a preferred example, the window size equals N/2. For illustration, assume N=8. The retransmit window size then corresponds to four data units. The window is positioned in the data unit sequence of the retransmit buffer as follows: [SN-window], where SN is the most recently transmitted sequence number. After the transmission of each data unit, the window location is incremented by one sequence number following the modulo-N sequence.

At time=T0, the transmitter transmits a data unit with a highest sequence number equal to 4 (block 64). The retransmit window is thus positioned so that it permits retransmission data units only between sequence numbers 1–4. At time T1, the transmitter transmits a data unit with a highest sequence number 5. Accordingly, the retransmit window is shifted so that it only permits retransmission of data units between sequence numbers 2–5 (block 66). For example, the transmitter cannot retransmit data units 0 or 1. At time=T2, the retransmit window slides to SN=6 and permits retransmission of data units only between sequence numbers 3–6 (block 66).

Another mechanism for avoiding ambiguities between originally-transmitted and retransmitted data units is to employ a receive window at the receiver. In this regard, reference is made to the Receive Window procedures (block 80) illustrated in flowchart form in FIG. 7. A receive (Rx) window size is determined (block 82). As with the retransmit window, it is preferred that the receive window be less than the highest sequence number N of a modulo-N numbering sequence. For example, the receive window is preferably N/2. When the receiver receives a data unit, it detects its sequence number, represented here by the variable X (block 84). A decision is made in block 86 whether sequence number X is inside the receive window. If it is, a determination is made whether that data unit X was previously received (block 90). If so, the data unit is discarded (block 92). If not, data unit X is placed in the reordering buffer at a position corresponding to sequence number X (block 94).

Figure 7:
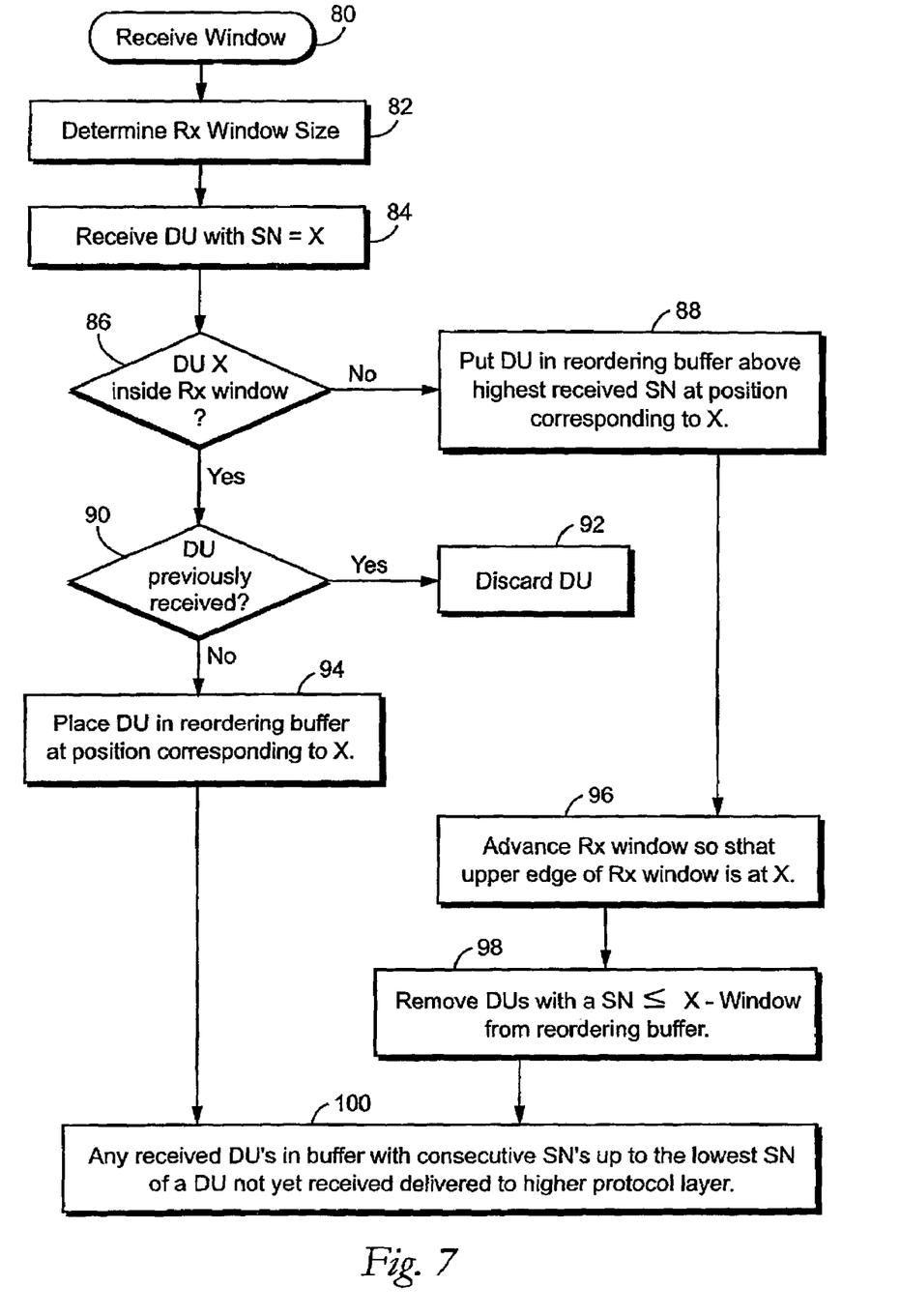
FIG. 7 illustrates a Receive Window routine in accordance with another example embodiment of an ambiguity prevention mechanism.

On the other hand, if the data unit with sequence number X is outside the receive window, it is stored in the reordering buffer above the highest received sequence number at a position corresponding to sequence number X (block 88). The receiver window is then advanced so that the upper edge of the receiver window is at sequence number X (block 96). Data units are then removed from the reordering buffer having a sequence number less than or equal to sequence number X minus the window size (block 98). After blocks 94 and 98, any received data units in the reordering buffer with consecutive sequence numbers up to the lowest sequence number of a data unit not yet received are removed from the reordering buffer and delivered to a higher protocol layer (block 100).

The retransmit window avoids ambiguity in the receiver by controlling which sequence number data units may be transmitted. Although the receive window does not restrict which data units can be received, it avoids ambiguity in the receiver by removing data units from the reordering buffer that are no longer inside the receive window and placing a received data unit in its proper location in the reordering buffer.

Figure 8A:
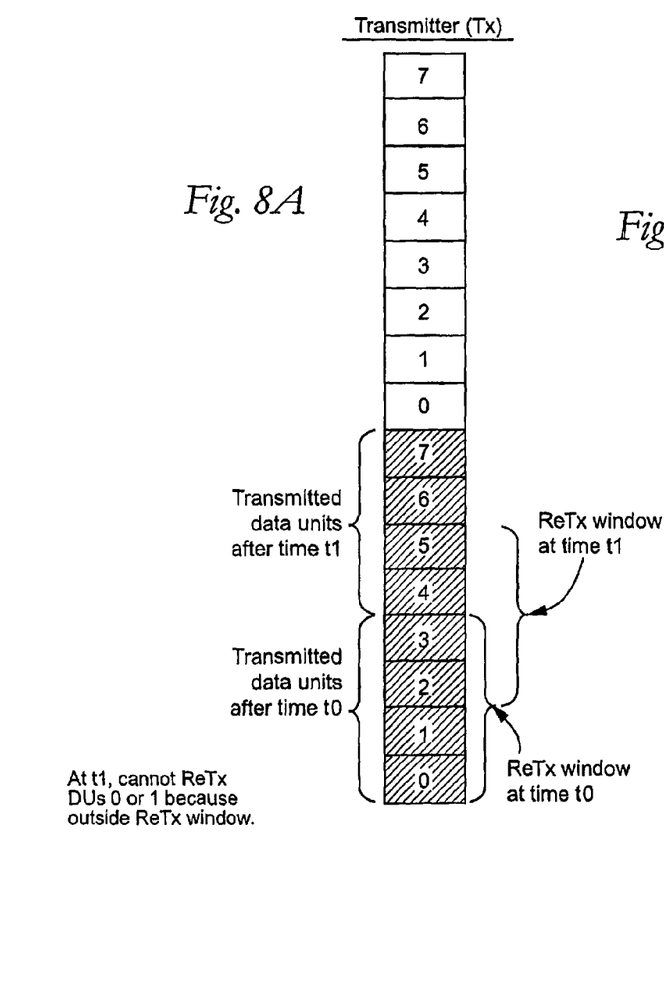
FIGS. 8A and 8B illustrate the ambiguity prevention mechanisms in accordance with FIGS. 6 and 7 in a simple example.

FIG. 8A illustrates an example of the retransmit window relative to the retransmit buffer at two different times T0 and T1. At time T0, the retransmit window having a size in this example of 4, is positioned to encompass transmitted data blocks 0, 1, 2, and 3. Any request to retransmit data units at time 0 will only be honored if it identifies a data unit with a sequence number of 0, 1, 2, or 3. A request for retransmission of a data unit 4, 5, 6, or 7 in this example would not be honored. However, at time T1 the window has been moved to encompass data units 2, 3, 4, and 5. At this point, a request to retransmit data units 0, 1, 6, or 7 would not be honored.

Figure 8B:
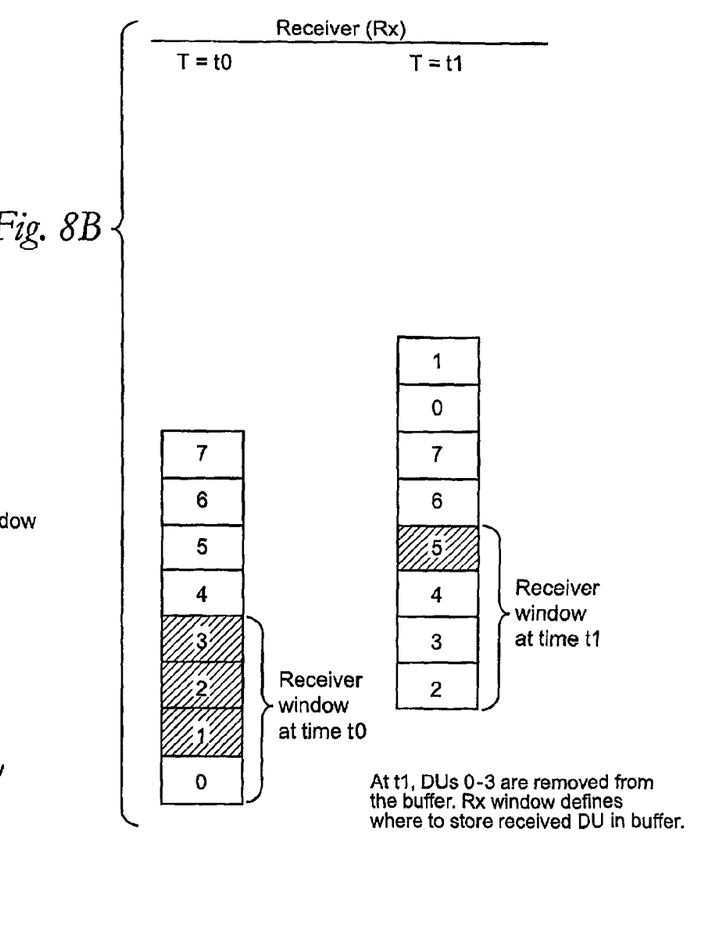

FIG. 8B illustrates an example of a receiver window relative to the reordering buffer. At time T0, the window is positioned over data units 0, 1, 2, and 3. Data units 1, 2, and 3 have been received, but data unit 0 has not yet been received. At time T1, data units 0 and 1 are below the window and are removed from the buffer. The Rx now window encompasses data units 2, 3, 4, and 5, but only data unit 5 has been received. Data units 6 and 7, although transmitted, have not yet been received. Any received data block greater than data unit 1 is placed by the receiver in the correct position in the reordering buffer.

Figure 9:
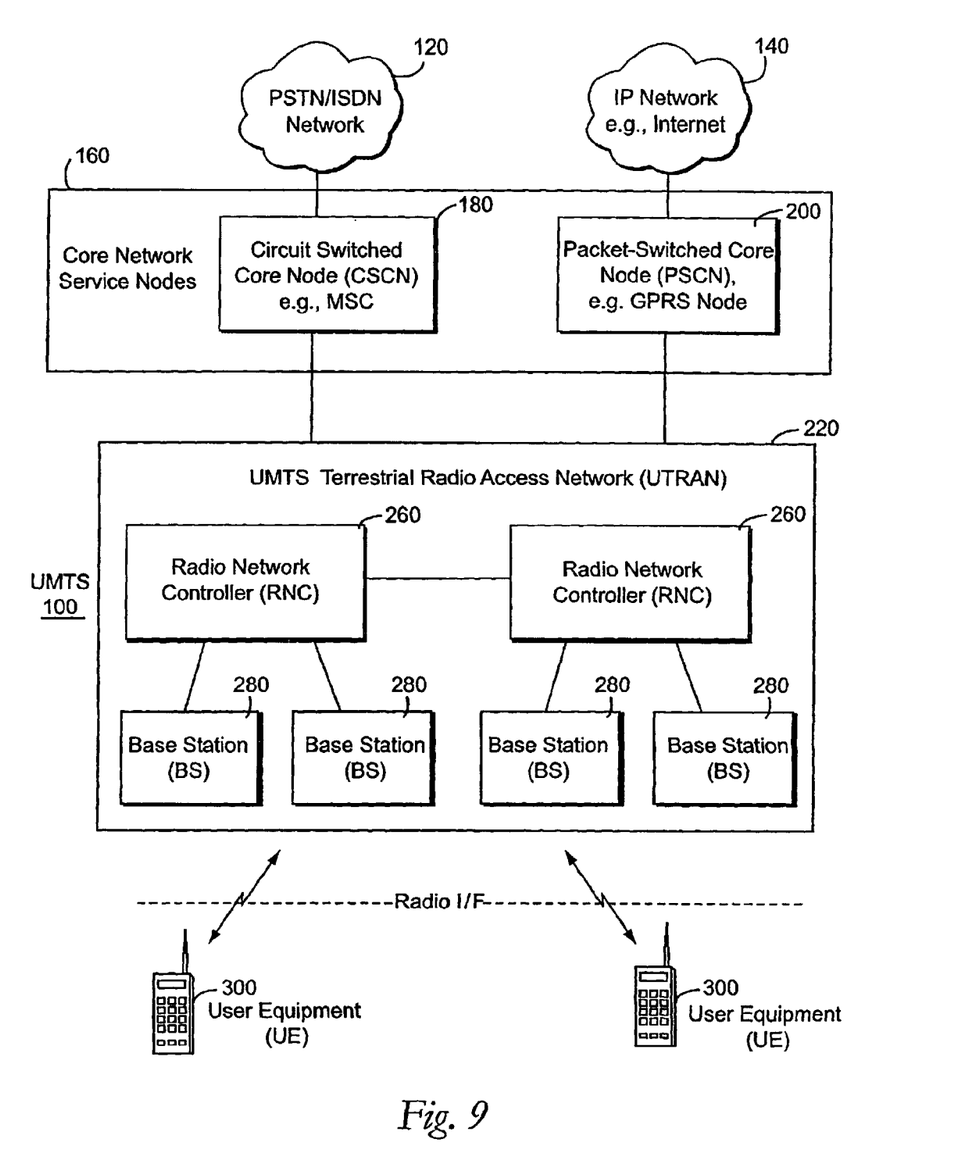
FIG. 9 illustrates an example communication system in which the present invention may be employed.

Although the present invention may be employed in any communications between a transmitter and receiver that employs an ARQ type protocol, a non-limiting example application to a Universal Mobile Telecommunications System (UMTS) such as that shown at reference numeral 100 in FIG. 9 is now described. A representative, circuit-switched core network, shown as cloud 120, may be, for example, the Public-Switched Telephone Network (PSTN) or the Integrated Services Digital Network (ISDN). A representative, packet-switched core network, shown as cloud 140, may be, for example, an IP network like the Internet. Both core networks are coupled to corresponding core network service nodes 160. The PSTN-ISDN circuit-switched network 120 is connected to a circuit-switched service node shown as a mobile switching center (MSC) 180 that provides circuit-switched services. The packet-switched network 140 is connected to a General Packet Radio Service (GPRS) node 200 tailored to provide packet-switched type services. Each of the core network service nodes 180 and 200 connects to a UMTS Terrestrial Radio Access Network (UTRAN) 240 that includes one or more radio network controllers (RNCs) 260. Each RNC is connected to a plurality of base stations (BSs) 280 and to other RNCs in the UTAN 220. Radio communications between one or more base stations in a mobile terminal (MT) 300, one type of wireless user equipment (UE), are by way of a radio interface.

The radio access in this non-limiting example is based on Wideband-CDMA, (WCDMA) with individual radio channels distinguished using spreading codes. Wideband CDMA provides wide radio bandwidth for multimedia services including packet data applications that have high data rate/bandwidth requirements. One scenario in which high speed data may need to be transmitted downlink to the UTRAN over the radio interface to a mobile terminal is when the mobile terminal requests information from a computer attached to the Internet, e.g., a website. In this example situation the base station is the transmitter, the UE mobile terminal is the receiver, and a High Speed Downlink Packet Access (HSDPA) channel may be employed.

Figure 10:
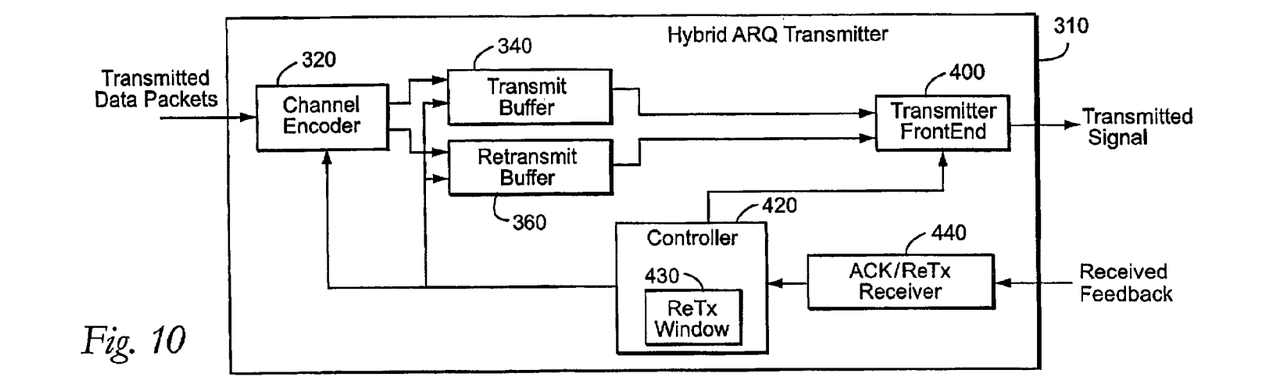
FIG. 10 illustrates a hybrid ARQ transmitter that may be employed in the example system shown in FIG. 9.
Figure 11:
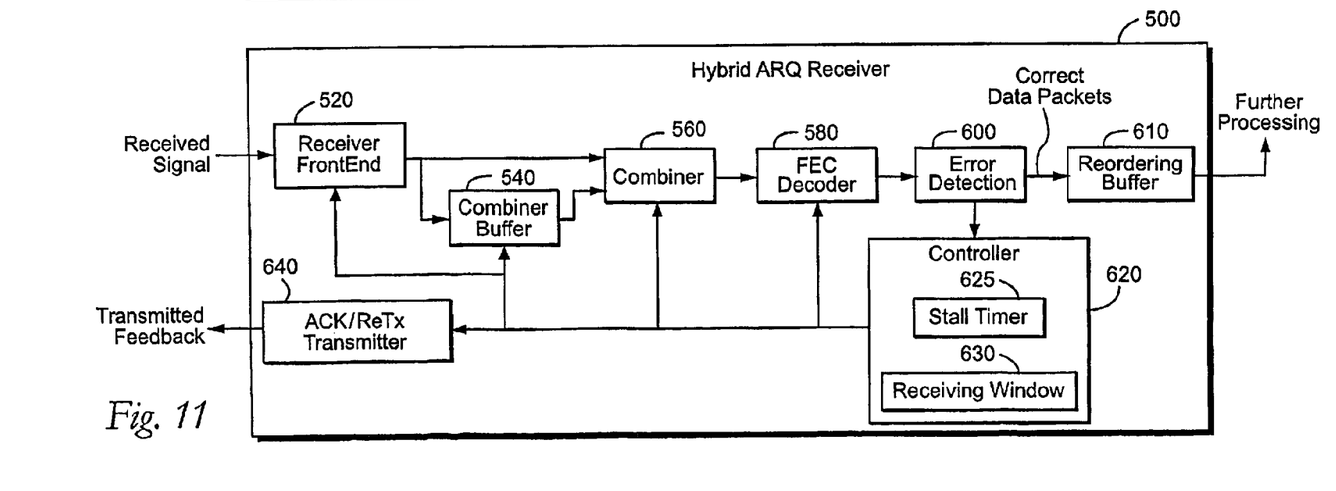
FIG. 11 is a function block diagram of a hybrid ARQ receiver that may be used in the example communication system shown in FIG. 9.

FIGS. 10 and 11, respectively, show in function block format a hybrid ARQ (HARQ) transmitter 310 and a hybrid ARQ receiver 500 that maybe used to implement the present invention in the system shown in FIG. 9. The HSDPA channel may employ a HARQ protocol as specified in the 3GPP Technical Specification (TS) 25.308 v0.1.0 "UTRA High Speed Downlink Packet Access," released by the 3GPP ($3^{rd}$ Generation Partnership Project) in September 2001.

The hybrid ARQ transmitter 310 in FIG. 10 includes the channel encoder 320, which performs channel encoding functions including coding original data from higher protocol layers with forward error correction and error detection bits. Data units including media access control (MAC) protocol data units (PDUs) are provided to a transmit buffer 340 as well as to a retransmit buffer 360. The controller 420 controls the operation of the channel encoder 320, the buffers 340 and 360, and the transmitter front end 400. Initially, PDUs stored in the transmit buffer 340 are sent via the transmitter front end as the transmitted signal. Depending upon the received feedback provided by the ACK/RETX receiver 440, the controller 420 using the retransmission window 340, controls selective retransmission of PDUs out of the retransmit buffer 360 via the transmitter front end 400.

The hybrid ARQ receiver 500 in FIG. 11 includes a receiver front end 520 which receives the signal transmitted over the communications channel from the transmitter. The received signal information is stored in a combiner buffer 540 and is also provided to a combiner 560. The output of the combiner 560 is processed in a forward error correction (FEC) decoder 580. The decoded output is processed in error detection block 600 to detect errors in the decoded output. If no errors are detected, the PDUs are stored in a reordering buffer 610. If errors are detected in the decoder output, the controller 620 may transmit a request for retransmission (ReTx) via ACK/ReTx transmitter 640. The controller 620 determines when a packet has not been received using sequence numbering information of received packets and the reordering buffer 610. This sequence number information is also used by the combiner 560 to perform incremental redundancy combining. Moreover, if the controller 620 receives a signal from error detection blocks 600 indicating that there are too many errors output by the FEC decoder 580, making error correction either too difficult or improbable, the controller 620 sends requests to retransmit.

The controller 620 includes a stall timer 625 and a receiving window 630. The stall timer 625 as described above is used to detect and break a stall condition and send PDUs in the reordering buffer 620 up to a higher processing layer whenever the stall timer expires. Moreover, the receiving window 630 is used by the controller 620 to avoid ambiguities with PDUs that are originally transmitted and those that are retransmitted.

The user equipment (UE) provides in-sequence delivery to higher layers by storing the correctly received data blocks in reordering buffers. Logically, one buffer per priority class is needed to provide in-sequence delivery per priority class. PDUs up to a first missing sequence number are delivered to higher layers in-sequence. When a data block is missing, all received data blocks with a higher SN are kept in the reordering buffer, e.g., see FIG. 1.

While the present invention has been described with respect to particular embodiments, those skilled in the art will recognize that the present invention is not limited to these specific exemplary embodiments. While it is preferable to use the stall avoidance timer, the retransmit window, and receive window together to avoid stalls and ambiguities, it is not necessary. Any one or two may be used to advantage. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only of the scope of the claims appended hereto.

What is claimed is:

1. A method for use in data unit transmissions between a transmitter and a receiver implemented in the receiver, comprising:

detecting a sequence number of data units received by the receiver;

storing the received data units in a buffer;

identifying a missing data unit in the sequence;

starting a timer if a data unit is received having a sequence number greater than a sequence number of the missing data unit;

if the timer expires before the missing data unit is received, removing from the buffer the received data units having sequence numbers less than the sequence number of the missing data unit;

receiving the missing data unit before the timer expires;

stopping the timer; and removing the received data units having a sequence number less than the sequence number of the missing data unit, the received missing data unit and the received data units each having a sequence number less than the sequence number of the received missing data unit are sent to a higher protocol layer for further processing.

2. The method in claim 1, wherein a missing data unit includes a data unit that has not been received, a data unit that is incorrectly received, or a received data unit that can not be corrected.

3. The method in claim 1, wherein a missing data unit includes a data unit that the receiver requests the transmitter to retransmit.

4. The method in claim 1, wherein the received data units having sequence numbers less than the sequence number of the missing data unit are sent to a higher protocol layer for further processing.

5. The method in claim 1, further comprising:
using a retransmission window at the transmitter to avoid sequence number ambiguity in the receiver between originally-transmitted data units and retransmitted data units.

6. The method in claim 1, further comprising:
using a receiving window at the receiver to avoid sequence number ambiguity in the receiver between originally-transmitted data units and retransmitted data units.

7. A method for use in data unit transmissions between a transmitter and a receiver implemented in the transmitter, where each data unit includes a corresponding sequence number, comprising:
transmitting data units in sequence modulo-N, N being a largest sequence number;
establishing a retransmission window having a size corresponding to a number of data units less than N; and
using the retransmission window to avoid sequence number ambiguity in the receiver between originally-transmitted data units and retransmitted data units,
wherein an upper end of the window is positioned at a sequence number that is less than or equal to a difference between a highest sequence number most recently transmitted and the window size, the method further comprising:
moving the retransmission window to a next sequence number position in the modulo-N sequence after each data unit is transmitted.

8. The method in claim 7, further comprising:
only permitting retransmission of one or more data units having a sequence number within a current position of the retransmission window in the sequence.

9. The method in claim 7, wherein the size of the retransmission window is N/2.

10. The method in claim 7, wherein a missing data unit includes a data unit that has not been received, a data unit that is incorrectly received, or a received data unit that can not be corrected.

11. The method in claim 7, wherein a missing data unit includes a data unit that the receiver requests the transmitter to retransmit.

12. The method in claim 7, further comprising:
identifying a missing data unit in the sequence;
starting a timer if a data unit is received having a sequence number greater than a sequence number of the missing data unit; and
if the timer expires before the missing data unit is received, removing from the buffer the received data units having sequence numbers less than the sequence number of the missing data unit.

13. The method in claim 7, further comprising:
using a receiving window at the receiver to avoid sequence number ambiguity in the receiver between originally-transmitted data units and retransmitted data units.

14. A method for use in data unit transmissions between a transmitter and a receiver implemented in the receiver, where each data unit includes a corresponding sequence number and is transmitted by the transmitter in sequence modulo-N, N being a largest sequence number, comprising:
a receiving window corresponding to a number of data units less than N,
using the receiving window to avoid sequence number ambiguity in the receiver between originally-transmitted data units and retransmitted data units,
if a recently-received data unit is outside the receiving window, then storing the recently-received data unit in the buffer at a position corresponding to the recently-received data unit sequence number, and
advancing the receiver window so that the sequence number of the recently-received data unit forms the upper end.

15. The method in claim 14, further comprising:
storing in a buffer a received data unit having a sequence number within a current position of the receiving window in the sequence, where an end of the receiving window is positioned at a sequence number that is less than or equal to a difference between a highest sequence number most recently transmitted and the window size,
wherein the received data unit is stored at location in the buffer corresponding to the sequence number of the received data unit.

16. The method in claim 15, further comprising:
removing from the buffer all received data units with consecutive sequence numbers up to a first missing data unit.

17. The method in claim 16, wherein the removed data units are provided to a higher protocol layer.

18. The method in claim 14, further comprising:
determining whether a recently-received data unit inside the receiving window was previously received, and if so, discarding the recently-received data unit.

19. The method in claim 14, wherein if a recently-received data unit inside the receiving window was not previously received, storing the recently-received data unit in the buffer in a position corresponding to the recently-received data unit sequence number.

20. The method in claim 14, further comprising:
removing from the buffer any data units having a sequence number less than the lower end of the receiver window.

21. The method in claim 14, wherein the size of the receiver window is N/2.

22. The method in claim 14, wherein a missing data unit includes a data unit that has not been received, a data unit that is incorrectly received, or a received data unit that can not be corrected.

23. The method in claim 14, wherein a missing data unit includes a data unit that the receiver requests the transmitter to retransmit.

24. The method in claim 14, further comprising:
identifying a missing data unit in the sequence;
starting a timer if a data unit is received having a sequence number greater than a sequence number of the missing data unit; and
if the timer expires before the missing data unit is received, removing from the buffer the received data units having sequence numbers less than the sequence number of the missing data unit.

25. The method in claim 24, further comprising:
using a retransmission window at the transmitter to avoid sequence number ambiguity in the receiver between originally-transmitted data units and retransmitted data units.

26. A receiver for receiving data units transmitted from a transmitter, comprising:
a detector for detecting a sequence number of data units received by the receiver;

a buffer for storing the received data units in a buffer;
a timer; and
electronic circuitry configured to:
  identify a missing data unit in the sequence;
  start the timer if a data unit is received having a sequence number greater than a sequence number of the missing data unit; and
  if the timer expires before the missing data unit is received, remove from the buffer the received data units having sequence numbers less than the sequence number of the missing data unit
  if the missing data unit is received before the timer expires, stop the timer, remove the received data units each having a sequence number less than the sequence number of the missing data unit, and send the received missing data unit and the received data units each having a sequence number less than the sequence number of the received missing data unit to a higher protocol layer for further processing.

27. The receiver in claim 26, wherein a missing data unit includes a data unit that has not been received, a data unit that is incorrectly received, or a received data unit that can not be corrected.

28. The receiver in claim 26, wherein a missing data unit includes a data unit that the receiver requests the transmitter to retransmit.

29. The receiver in claim 26, wherein the electronic circuitry is configured to send received data units having sequence numbers less than the sequence number of the missing data unit to a higher protocol layer for further processing.

30. The receiver in claim 26, wherein the electronic circuitry is configured to use a receiving window to avoid sequence number ambiguity between originally-transmitted data units and retransmitted data units.

31. A transmitter for use in transmitting data units to a receiver, where each data unit includes a corresponding sequence number, comprising:
  a transmitter for transmitting data units in sequence modulo-N, N being a largest sequence number;
  a retransmission window having a size corresponding to a number of data units less than N; and
  a controller configured to use the retransmission window to avoid sequence number ambiguity in the receiver between originally-transmitted data units and retransmitted data units,
  the controller is configured to position an upper end of the window at a sequence number that is less than or equal to a difference between a highest sequence number most recently transmitted and the window size.

32. The transmitter in claim 31, wherein the controller is configured to only permit retransmission of one or more data units having a sequence number within a current position of the retransmission window in the sequence.

33. The transmitter in claim 31, wherein the controller is configured to move the retransmission window to a next sequence number position in the modulo-N sequence after each data unit is transmitted.

34. The transmitter in claim 31, wherein the size of the retransmission window is N/2.

35. A receiver for use in data unit transmissions between a transmitter and the receiver, where each data unit includes a corresponding sequence number and is transmitted by the transmitter in sequence modulo-N, N being a largest sequence number, comprising:
  a receiving window corresponding to a number of data units less than N,
  a controller configured to use the receiving window to avoid sequence number ambiguity in the receiver between originally-transmitted data units and retransmitted data units, and
  a buffer,
  if a recently-received data unit is outside the receiving window, the controller is configured to store the recently-received data unit in the buffer at a position corresponding to the recently-received data unit sequence number and advance the receiver window so that the sequence number of the recently-received data unit forms the upper end.

36. The receiver in claim 35, further comprising:
  wherein the controller is configured to store in the buffer a received data unit having a sequence number within a current position of the receiving window in the sequence, where an end of the receiving window is positioned at a sequence number that is less than or equal to a difference between a highest sequence number most recently transmitted and the window size,
  wherein the received data unit is stored at location in the buffer corresponding to the sequence number of the received data unit.

37. The receiver in claim 35, wherein the controller is configured to determine whether a recently-received data unit inside the receiving window was previously received, and if so, discard the recently-received data unit.

38. The receiver in claim 35, wherein if a recently-received data unit inside the receiving window was not previously received, the controller is configured to store the recently-received data unit in the buffer in a position corresponding to the recently-received data unit sequence number.

39. The receiver in claim 35, wherein the controller is configured to remove from the buffer any data units having a sequence number less than the lower end of the receiver window.

40. The receiver in claim 35, wherein the controller is configured to remove from the buffer all received data units with consecutive sequence numbers up to a first missing data unit.

41. The receiver in claim 35, wherein the size of the receiver window is N/2.

42. The receiver in claim 35, further comprising:
  a timer,
  wherein the controller is configured to:
  identify a missing data unit in the sequence;
  start the timer if a data unit is received having a sequence number greater than a sequence number of the missing data unit; and
  if the timer expires before the missing data unit is received, remove from the buffer the received data units having sequence numbers less than the sequence number of the missing data unit.

* * * * *